Aug. 5, 1958 R. K. CROOKS 2,846,508
CONTROL MEANS FOR CARRIER SIGNALING AND COMMUNICATION EQUIPMENTS
Original Filed July 7, 1950
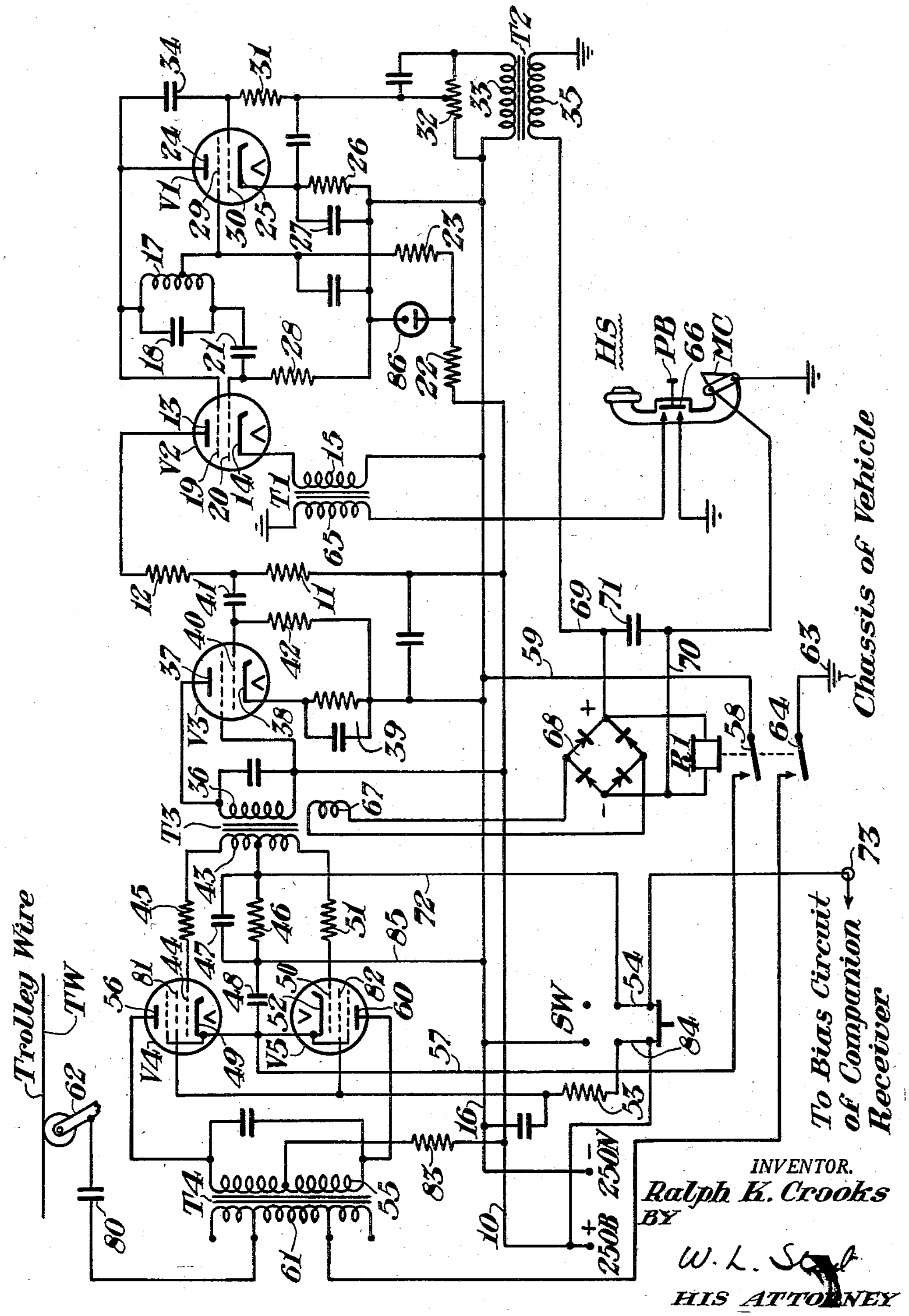
INVENTOR.
Ralph K. Crooks
BY
W. L. S[illegible]
HIS ATTORNEY United States Patent Office 2,846,508

Patented Aug. 5, 1958

2,846,508

CONTROL MEANS FOR CARRIER SIGNALING AND COMMUNICATION EQUIPMENTS

Ralph K. Crooks, Worthington, Ohio, assignor to Westinghouse Air Brake Company, Wilmerding, Pa., a corporation of Pennsylvania Original application July 7, 1950, Serial No. 172,560, now Patent No. 2,721,979, dated October 25, 1955. Divided and this application September 13, 1955, Serial No. 534,007

5 Claims. (Cl. 179—15.55)

My invention relates to switching and control means for carrier signaling and communication equipments, and more particularly to means for controlling the condition of the transmitter of carrier signaling and communication equipments.

The present application is a division of my copending application Serial No. 172,560, filed on July 7, 1950, now Patent No. 2,721,979, for Switching and Control Means for Carrier Signaling and Communication Equipments.

Carrier signaling and communication equipments generally include a transmitter and a receiver. The transmitter includes means for supplying a selected carrier frequency, means to modulate the carrier with the desired signaling or communication frequency, a power amplifier and means for supplying the output of the transmitter to a transmitting circuit or medium. The companion receiver includes means for demodulating such carrier current picked up from the transmitting circuit or medium and means for reproducing the signaling or communication frequency.

Generally speaking, the transmitter is inactive except during periods when the carrier current is supplied to the transmitting circuit. For example, in simplex carrier communication systems for railway trains, the receiver of each equipment of the system is energized ready to receive and the transmitter is deenergized and inactive during noncommunication periods. The transmitter is retained inactive during the period of receiving a message and is switched to an active condition and the receiver of the same equipment is made inactive during the period when a message is being sent from that equipment. Also, in some carrier signaling systems, a signal is formed by coding the carrier, and the transmitter includes means for recurrently opening and closing the oscillator output or opening and closing the power supply for the oscillator in order to code the output of the transmitter. Again, in carrier communication systems for electric railways, the communication equipment is, preferably, powered from the propulsion current system which is usually of a relatively high voltage, a voltage sufficiently high to be dangerous to anyone coming in contact therewith. In such communication systems for electric railways the different control and other circuits of the communication equipment are generally connected to the high voltage trolley wire or third rail through a resistive network which reduces the high voltage to different low voltages suitable for the communication equipment. In such an arrangement, a broken ground connection of an element of the equipment may cause the high potential of the trolley wire or third rail with respect to ground to be present in the circuit on the side away from the break and this may be dangerous to the operator or maintainer who handles the equipment.

Accordingly, a feature of my invention is the provision of novel and improved switching and control means for carrier signaling and communication equipments.

Another feature of my invention is the provision of improved means for switching a carrier transmitter between an active and an inactive condition.

Another feature of my invention is the provision of a carrier transmitter incorporating improved means whereby the different circuit elements which are handled by an operator are electrically isolated from the power source so that when a high voltage source is used the danger of shock to the operator is minimized.

Still another feature of my invention is the provision of a carrier transmitter incorporating novel means whereby the power amplifier and the output of the transmitter are made effective only when the oscillator is activated and shock excitation during noncommunication periods is avoided and the power consumed during noncommunication periods is reduced.

Other features, objects and advantages of my invention will be apparent as the specification progresses.

The foregoing novel features for switching a carrier transmitter are attained by the provision of a switching or keying means which includes a transformer and a two-position switch or push-to-talk device. The transformer is provided with independent primary and secondary windings, the primary winding being interposed in the cathode lead of the electron tube oscillator of the transmitter. The secondary winding is connected to the two-position switch in such a manner that the secondary winding is either open-circuited or short-circuited according as the switch is set at a first or a second position. When the secondary winding is short-circuited the primary winding presents a low impedance to the carrier frequency current, generated by the oscillator tube, and the oscillator is made active to establish the oscillation so that the carrier is then supplied in the usual manner. When the secondary winding is open-circuited the primary winding presents a high impedance to the carrier frequency current and the oscillator ceases to generate the oscillations. By this means the transmitter is switched to its active condition to supply the carrier when the switching device is closed to activate the oscillator and the transmitter is switched to an inactive condition when the switching device is opened to cause the oscillator to be inactive.

By this transformer arrangement the switching device, which is usually activated by the operator, is completely isolated from the power source for the oscillator and, if a high voltage source is used for energizing and transmitter, the danger of shock to the operator is minimized.

Again, I provide a coupling transformer between the oscillator output and the input of the power amplifier of the transmitter with a second or auxiliary secondary winding. This auxiliary secondary winding picks up a selected portion of the carrier current energy. The auxiliary winding is connected to the input or alternating current terminals of a full wave rectifier, the output or direct current terminals of which are connected to a winding of a control relay with the result the control relay is released when the oscillator is inactive and energized and picked up when the oscillator is rendered active by operation of the keying means. The control relay is used to govern the energization of the power amplifier, and it may also be used to control the connection of the output of the transmitter to the transmitting medium, or it may be used to effect any other desired control.

A microphone circuit is also powered from the rectifier in multiple with the control relay and the microphone circuit is transformer coupled to the input of a modulating tube which is, in turn, connected to the input of the oscillator in such a manner as to modulate the carrier in accordance with the frequency supplied through the microphone circuit. With the microphone circuit thus energized, the microphone, which is usually a part of the handset of the equipment and which is handled by the operator, is electrically isolated from the supply voltage source so that if the high voltage source is used for energizing the equipment the danger of shock to the operator is minimized.

According to my invention, a voltage suitable for biasing the companion receiver is derived from the transmitter through a biasing unit which includes a capacitor and a resistor in multiple and which unit is interposed in the grid circuit of the power amplifier of the transmitter. The grid rectification of the carrier voltage applied to the grid circuit of the power amplifier creates a direct current voltage across this biasing unit when the transmitter is active and the voltage is applied to a selected terminal of the transmitter and is thus available for use as a biasing voltage for the companion receiver. This biasing voltage can be applied to the receiver in such a way that the receiver is deactivated during the periods when the transmitter is active.

I also provide the transmitter with a switching means wherewith the usual biasing voltage, created by the transmitter, for deactivating the receiver can be interrupted and the power amplifier of the transmitter can be greatly reduced in its energy output to enable the receiver to be tested by activating the transmitter.

I shall describe a preferred form of switching and control means embodying my invention and shall then point out the novel feature thereof in claims.

The accompanying drawing is a diagrammatic view showing one form of apparatus embodying the invention when used with a transmitter of a frequency modulated carrier telephone system for electric railways, the transmitter being suitable for use in connection with a vehicle carried equipment of the system.

It is to be understood that the invention is not limited to the use shown in the drawing. This showing is merely illustrative of the apparatus and there are other places and applications where the invention may be used.

Referring to the drawing, the transmitter comprises as essential elements a modulator tube V1, an oscillator tube V2, a driver tube V3, a pair of power amplifier tubes V4 and V5, a keying or switching means, a microphone and microphone circuit, a control relay and a checking means, together with a source of power and suitable coupling circuit.

As stated hereinbefore, the apparatus here illustrated is that of communication equipment suitable for use in connection with a vehicle associated with an electrified railway and power for the communication equipment is obtained from the propulsion system which includes a trolley wire TW and the track rails, not shown. The voltage of the propulsion current system may be in the order of 500 to 600 volts. A voltage proper for the communication transmitter may be derived from the trolley wire through a resistive network of any suitable form, not shown. For example, a resistive network for providing the suitable voltages may be that shown in a copending application of common ownership, Serial No. 51,578, filed September 28, 1948, by Edgar W. Breisch, for Power Supply Circuits, now abandoned. It is sufficient for the present application to point out that a direct voltage of the order of 250 volts is provided between the positive terminal 250B and the negative terminal 250N through a suitable resistive network having connection to the trolley wire and to the track rails through the chassis of the vehicle.

In addition to the voltage applied at the terminals 250B and 250N, the source also provides a suitable low voltage for heating the tubes V1 to V5, inclusive, so that these tubes are normally ready for operation, the heating circuit not being shown since it forms no part of the present invention.

The tubes V1, V2, and V3 are tetrodes each having an anode, a cathode and a first and a second grid or control electrode, but other types of tubes may be used. The oscillator tube V2 is powered through an anode-cathode circuit which extends from the positive terminal 250B through a positive bus wire 10, two resistors 11 and 12 in series, anode 13 and tube space to cathode 14 of the tube V2, a primary winding 15 of a transformer T1 to be referred to later, and a negative bus wire 16 to the negative terminal 250N. Thus the oscillator tube V2 is normally supplied with power, the value of the current flowing in the anode-cathode circuit being governed, in part, by the resistance of the winding 15 of the transformer T1.

An oscillatory circuit comprising an inductor 17 and a capacitor 18 is provided for the tube V2 and connected across the two grids 19 and 20 of the tube. One terminal of the oscillatory circuit is connected directly to the control grid 19 and the other terminal of oscillatory circuit is connected to the control grid 20 through a coupling capacitor 21. The grid 20 is, preferably, provided with a grid leak resistor 28. The parts are so proportioned that the oscillatory circuit is tuned to resonate at a selected carrier frequency, and the parts are further so proportioned that oscillations of the carrier frequency are generated when current of at least a given value flows in the anode-cathode circuit but that the oscillations are suppressed when the energy supplied to the anode-cathode circuit falls below this given value. It follows that the oscillator tube V2 can be keyed or switched between an active condition where it generates the oscillations and an inactive condition where it no longer generates the oscillations by control of the impedance of the winding 15 of the transformer T1.

The modulator tube V1 is coupled to the input of an oscillator tube V2 in such a manner as to frequency modulate the oscillations generated by the tube V2. The modulator tube V1 is provided with an anode-cathode circuit that extends from terminal 250B through bus wire 10, resistors 22 and 23 in series, a selected portion of the inductor 17 of the oscillatory circuit, anode 24 and tube space to cathode 25 of tube V1, biasing unit consisting of a resistor 26 and a capacitor 27 in multiple, and the negative bus wire 16 to the negative terminal 250N. Preferably, a voltage limiter tube 86 is connected between the junction terminals of resistors 22 and 23 and the grid leak resistor 28.

Since the grid 20 of the tube V2 is connected to the negative bus wire 16 through the grid leak resistor 28 and the control grid 19 of the tube V2 is connected directly to the anode 24 of the tube V1, it is to be seen that the tube V1 is in multiple with the oscillatory circuit and a variation of the impedance of the tube V1 will cause a change in the tuning of the oscillatory circuit and thus change the frequency of the oscillations created by the tube V2. A control electrode 29 of the tube V1 is connected to the positive terminal 250B through the resistors 22 and 23 in the usual manner, and the other control electrode 30 of the tube V1 is provided with a circuit which includes the electrode 30, a resistor 31, a portion of a variable resistor 32 which is connected across winding 33 of a transformer T2, the biasing unit 26—27, and the cathode 25. Preferably, a capacitor 34 is connected between the grid 30 and the anode 24.

It is clear that a voltage induced in the winding 33 of the transformer T2 will be applied to the control grid 30 of the tube V1 to vary the impedance of the tube and in turn vary the frequency of the oscillations created by the oscillator tube V2. In other words, a signaling or communication frequency applied to the primary winding 35 of the input transformer T2 is effective to frequency modulate the carrier oscillations. By way of illustration and as an aid to the understanding of the invention I shall assume that the parts are so proportioned that the oscillations are of a carrier frequency of 88 kc. and this carrier frequency is modulated by voice frequencies in the range of 300 to 3000 cycles per second.

The driver tube V3 is provided with an anode-cathode circuit which includes the positive terminal 250B, bus wire 10, a tuned primary winding 36 of a coupling transformer T3, anode 37 and tube space to cathode 38 of the tube V3, a biasing unit 39 and the negative bus wire 16. A control electrode 40 of the tube V3 is coupled to the junction terminal of the resistors 11 and 12 interposed, in the anode circuit of the oscillator tube V2 through a coupling capacitor 41. Also, the control grid 40 is provided with a grid leak resistor 42. Thus, the output of the oscillator tube V2 is applied to the control grid 40 of the driver tube V3 and the carrier frequency or the carrier modulated by the signaling frequency is reproduced in the primary winding 36 of the coupling transformer T3. This current flows in the primary winding 36 and induces a corresponding electromotive force in the secondary winding 43 of the coupling transformer T3.

The power tube V4 and V5 are pentodes, but other types of tubes can be used. The two tubes are used in push-pull and the two input circuits include the two half portions of the secondary winding 43 of the coupling transformer T3, the circuit for the tube V4 including a control electrode 44, resistor 45, top half portion of winding 43, a biasing unit consisting of a resistor 46 and a capacitor 47 in multiple, wires 85, 16, and 59, front contact 58 of relay R1 to be referred to later, wire 57 and cathode 49 of the tube V4. Similarly, the input circuit of tube V5 includes control electrode 50, resistor 51, lower half portion of winding 43 of the coupling transformer, biasing unit 46—47, wires 85, 16, and 59, front contact 58, wire 57, and cathode 52 of the tube V5.

The grids 81 and 82 of the tubes V4 and V5, respectively, are connected in multiple to the positive terminal 250B through a resistor 53 and a blade 84 of a double-pole double-throw switch SW, to be referred to later. A bypass capacitor 48 is connected between the biasing unit 46—47 and the cathodes of the tubes V4 and V5. The parts are so proportioned that the positive voltages thus applied to the grids 81 and 82 cause the tubes V4 and V5 to operate at a desirable selected point of their characteristic curves. The outputs of the two tubes V4 and V5 are connected to the two half portions of the tuned primary winding 55 of an output transformer T4, the circuit for the tube V4 extending from the positive bus wire 10, through resistor 83, the top half portion of winding 55 of the output transformer, anode 56 and tube space to cathode 49 of tube V4, wire 57, front contact 58 of control relay R1 with that relay energized in a manner to appear shortly, and wire 59 to the negative bus wire 16. Similarly, the output of the tube V5 extends from the positive bus wire 10 through resistor 83, the lower half portion of winding 55, anode 60 and tube space to cathode 52 of tube V5 and thence to the negative bus wire 16 over the same circuit as traced for the tube V4.

These output circuits for the power tubes of the transmitter are coupled to the transmitting or sending circuit of the system through the secondary winding 61 of the output transformer T4, the secondary winding 61 having one terminal connected to the trolley wire TW through a blocking capacitor 80 and the trolley pole and wheel 62, and the lower terminal of the secondary winding 61 being connected to the rails through the front contact 64 of relay R1 and the chassis terminal 63, it being understood that the chassis is electrically connected to the rails through the frame of the vehicle truck and wheels and axles.

It is to be explained that in carrier communication systems for electric railways, the transmitting circuit for the communication system is often made to include the trolley wire as one side of the circuit and the track rails as the other side of the transmitting circuit, the connection to the trolley wire being through a blocking capacitor and the connection to the rails being through the frame and wheels of the vehicle.

It is to be seen from the foregoing that the communication current applied to the input of the power amplifier tubes V4 and V5 through the driver tube V3 is amplified to a relatively high energy level and supplied to the transmitting circuit comprising the trolley wire and the track rails.

According to my invention, the active and inactive condition of the oscillator tube V2, and hence of the transmitter, are controlled through the transformer T1 and a suitable switching means, here shown as a push-to-talk button PB, mounted on the usual handset HS of the communication equipment. The primary winding 15 of the transformer T1 is interposed in the anode-cathode circuit for the oscillator tube V2 in the manner already explained. The secondary winding 65 of the transformer T1 is connected across the contact 66 of the push button PB, one side of the circuit being completed through the ground connection. When the push button PB is released and contact 66 is open, the secondary winding 65 is open-circuited and the load on the primary winding 15 is low and the primary winding presents a high impedance at the carrier frequency and as a result the energization of the oscillator is reduced so that it fails to create oscillations. When the push-to-talk button PB is pressed to close its contact 66, the secondary winding 65 is short-circuited and the load on the primary winding 15 is high and the primary winding presents a relatively low impedance for the carrier frequency and as a result the energization of the oscillator is increased to a point where it becomes active to generate the carrier oscillations. Consequently, the oscillator V2 is made active as long as the push button is closed and is made inactive as long as the push button is released. This method of switching or keying the transmitter is unique in that it is done through the usual push button of the handset provided for systems of the type here involved. This switching arrangement has advantages that the transmitter is turned on and off in such a way as to prevent shock excitation to the various equipments that may be connected to the transmitting circuit. Also, this arrangement completely isolates the push button from the high voltage source for the transmitter and the push button, which the operator must handle, is included in a low voltage circuit that avoids the possibility of an operator coming in contact with the high voltage potential.

According to my invention, I also provide energy for a control relay and a microphone circuit by providing the coupling transformer T3, between the driver tube V3 and the power amplifier tubes, with an auxiliary secondary winding 67. The winding 67 is connected across the alternating current or input terminals of a full wave rectifier 68. The output or direct current terminals of this rectifier are connected across the winding of the control relay R1 and thus, when the oscillator V2 is made active, a selected part of the carrier energy is picked up by the auxiliary secondary winding 67 of the coupling transformer T3 and the energy is rectified and used to energize the control relay R1. The parts are so proportioned that the relay R1 is energized and picked up to close its front contacts 58 and 64 in response to the active condition of the oscillator. The front contact 58 is interposed in the low potential lead of the anode-cathode circuits of the power amplifier tubes as previously explained, and thus power is applied to the power tubes only when the oscillator is switched to its active condition.

Also, the output circuit is held open with the front contact 64 of the relay R1 except during sending periods. These two controls of the output of the power amplifier have the advantages that the contact 58 serves to economize the power consumed by the power amplifier during noncommunication periods and shock excitation of other communication equipments, due to sudden variation of the power source during noncommunication periods, is avoided. Also, the front contact 64 interposed in the output circuit serves to avoid noise on the trolley wire and abrupt changes of the signal energy level from shock excitation through the output circuit.

In practicing my invention I have found it desirable to enclose the control relay R1 within the shield case provided for the transmitter to avoid the possibility of a maintainer accidentally coming in contact with the high voltage present at the contact 58 of the relay.

Furthermore, according to my invention, a microphone circuit is powered from the output of the rectifier 68 in multiple with the control relay R1. To be explicit, the microphone circuit extends from the positive terminal of the rectifier 68 through wire 69, winding 35 of the input transformer T2, ground connection, microphone MC and wire 70 to the negative terminal of the rectifier. A high frequency bypass capacitor 71 is connected across this microphone circuit. Thus when the transmitter is activated, due to the closing of the push button PB, the microphone circuit becomes energized so that the operator, by speaking into the microphone MC, can cause corresponding frequency modulations of the carrier through the modulation tube V1 in the manner already explained.

The advantages of this microphone circuit arrangement are that a direct current voltage for the microphone is obtained without an additional source of power and by a circuit that is completely isolated from the high voltage power source with the result that danger for the operator who uses the handset is minimized.

It is to be pointed out that when the transmitter is made active, the modulated carrier applied to the input of the power amplifier creates a direct current voltage at the biasing unit 46—47 due to the grid rectification action of the power amplifier tubes. This direct current voltage is taken off of the unit 46—47 through wire 72 and the right-hand blade 54 of the switch SW to a terminal 73 where this voltage becomes available as a source of bias voltage for the companion receiver. That is, this bias voltage can be applied to the receiver in such a manner as to desensitize the receiver during the periods that the transmitter is active.

The switch SW and its control provide a novel means for checking and testing the companion receiver. When the switch SW is thrown to its top position, that is, to the position opposite that shown in the drawing, the connection for applying the desensitizing voltage to the receiver from the biasing unit 46—47 is opened at the right-hand blade 54 of the switch SW, and the connection of the positive power to the grids 81 and 82 of the power amplifier tubes is open at the left-hand blade 84 of the switch and the grids are connected to the negative power terminal with the result that the power amplifier tubes are greatly reduced in their gain and the output energy is reduced to a low level. Since the companion receiver is now in its active condition it is responsive to this low level output of the transmitter and such response can be used to check the normal operating condition of the receiver.

Although I have herein shown and described but one form of switching and control means for carrier signaling and communication equipments embodying my invention, it is understood that various changes and modifications may be made therein within the scope of the appended claims without departing from the spirit and scope of my invention.

Having thus described my invention, what I claim is:

1. In a carrier communication system transmitter, the combination comprising, an electron tube oscillator operable to supply a carrier of a given frequency, keying means including a two-position switch coupled to said oscillator to render the oscillator inactive or active to supply said carrier according as the switch is set at a first or a second position, an electron tube power amplifier, a transformer having a primary winding coupled to the output of said oscillator and a secondary winding coupled to the input of said power amplifier, a control relay, a full wave rectifier, said transformer being provided with an auxiliary secondary winding to receive carrier energy when the oscillator is activated, means including said rectifier to connect said auxiliary secondary winding to a winding of said relay to energize said relay when said oscillator is activated, and means including a contact closed only when the relay is energized to activate said power amplifier.

2. In a carrier communication system transmitter, the combination comprising, an electron tube oscillator operable to supply a carrier of a given frequency, keying means including a two-position switch coupled to said oscillator to render the oscillator inactive or active to supply said carrier according as the switch is set at a first or a second position, an electron tube power amplifier, a transformer having a primary winding coupled to the output of said oscillator and a secondary winding coupled to the input of said power amplifier, a control relay, a full wave rectifier, said transformer being provided with an auxiliary secondary winding to receive carrier energy when the oscillator is activated, means including said rectifier to connect said auxiliary secondary winding to a winding of said relay to energize said relay when said oscillator is activated, means including a contact closed only when the relay is energized to activate said power amplifier, and an output circuit coupled to the output of said power amplifier and including a contact closed only when said relay is energized.

3. In a carrier communication system transmitter, the combination comprising, an electron tube oscillator operable to supply a carrier of a given frequency, keying means for rendering said oscillator inactive or active to supply said carrier, a normally deactivated electron tube power amplifier, a transformer having a primary winding coupled to the output of said oscillator and a secondary winding coupled to the input of said power amplifier, an auxiliary secondary winding for receiving carrier energy when said oscillator is activated, means for activating said power amplifier in response to carrier energy in said auxiliary secondary winding.

4. In a carrier communication system transmitter, the combination comprising, an electron tube oscillator operable to supply a carrier of a given frequency, keying means for rendering said oscillator inactive or active to supply said carrier, a normally deactivated electron tube power amplifier, a transformer having a primary winding coupled to the output of said oscillator and a secondary winding coupled to the input of said power amplifier, an auxiliary secondary winding for receiving carrier energy when said oscillator is activated, means for activating said power amplifier in response to carrier energy in said auxiliary secondary winding, said means comprising a direct current relay connected through a full-wave rectifier to said auxiliary secondary winding.

5. In a carrier communication system transmitter, the combination comprising, an electron tube oscillator operable to supply a carrier of a given frequency, keying means for rendering said oscillator inactive or active to supply said carrier, a normally deactivated electron tube power amplifier, a transformer having a primary winding coupled to the output of said oscillator and a secondary winding coupled to the input of said power amplifier, an auxiliary secondary winding for receiving carrier energy when said oscillator is activated, means for activating said power amplifier in response to carrier energy in said auxiliary secondary winding, and an output circuit for said power amplifier, said output circuit being completed by said power amplifier activating means.

References Cited in the file of this patent

UNITED STATES PATENTS

| | | |
|---|---|---|
| 2,064,639 | Whitelock et al. | Dec. 15, 1936 |
| 2,432,560 | Crooks | Dec. 16, 1947 |